United States Patent

Pohl et al.

[11] Patent Number: 5,844,493
[45] Date of Patent: Dec. 1, 1998

[54] ELECTROMECHANICAL SWITCHING DEVICE AND ARRANGEMENT WITH SEVERAL SWITCHING DEVICES

[75] Inventors: Fritz Pohl, Hemhofen; Wilfried Jaehner, Nürenberg, both of Germany

[73] Assignee: Siemens Aktiengesellschaft, Münechen, Germany

[21] Appl. No.: 793,657

[22] PCT Filed: Aug. 17, 1996

[86] PCT No.: PCT/DE95/01089

§ 371 Date: May 13, 1997

§ 102(e) Date: May 13, 1997

[87] PCT Pub. No.: WO96/07192

PCT Pub. Date: Mar. 7, 1996

[30] Foreign Application Priority Data

Aug. 26, 1994 [DE] Germany .......................... 44 30 382.3
Mar. 30, 1995 [DE] Germany ........................ 195 11 795.6

[51] Int. Cl.[6] .................................................. G08B 21/00
[52] U.S. Cl. .......................... 340/657; 340/638; 340/644; 361/87; 361/93
[58] Field of Search ................................ 361/87, 93, 7, 361/160, 170; 340/657, 635, 638, 639, 644

[56] References Cited

U.S. PATENT DOCUMENTS

| 3,634,794 | 1/1972 | Verbeke .................................. 335/153 |
| 4,611,201 | 9/1986 | Guim et al. ............................. 340/638 |
| 4,706,073 | 11/1987 | Masot ...................................... 340/639 |
| 5,051,861 | 9/1991 | Purkayastha et al. ................... 361/96 |

FOREIGN PATENT DOCUMENTS

| 0 050 417 | 4/1982 | European Pat. Off. . |
| 0 226 530 | 6/1987 | European Pat. Off. . |
| 0 678 890 | 10/1995 | European Pat. Off. . |
| 1 446 225 | 9/1965 | France . |
| 2 201 470 | 4/1974 | France . |
| 2 217 846 | 9/1974 | France . |
| 2 380 652 | 9/1978 | France . |
| 2 512 993 | 3/1983 | France . |
| 32 46 739 | 6/1983 | Germany . |
| 33 33 833 | 4/1985 | Germany . |
| 36 37 133 | 5/1987 | Germany . |
| 94 06 897.6 | 7/1994 | Germany . |
| 91 16 877.5 | 8/1994 | Germany . |

OTHER PUBLICATIONS

Heindenrich, W. et al., "*Magnetfeldempfindliche Halbleiter–Positionssensoren Awenwendugn, Auswahl und Beispeile*", Electronik Industie, No. 5 (1985), pp. 42–52 *.

Primary Examiner—Edward Lefkowitz
Attorney, Agent, or Firm—Kenyon & Kenyon

[57] ABSTRACT

Switching devices can have means for contactless switching position detection. According to the invention, magnetic field sensors arranged at suitable locations inside and/or outside a device housing are provided for switching position detection. In particular, position-dependent magnetic fields are measured for ON/OFF position detection, overcurrent triggering, and contact welding; however, the magnetic field of the current flowing is detected to recognize short-circuit triggering. Differential Hall effect sensors and Reed contacts, respectively, can be used for these purposes. In addition, a sound sensor can be provided for detecting the switching noise, whose signal is evaluated together with the overcurrent triggering signal for short-circuit detection.

24 Claims, 11 Drawing Sheets

5,844,493

ELECTROMECHANICAL SWITCHING DEVICE AND ARRANGEMENT WITH SEVERAL SWITCHING DEVICES

FIELD OF THE INVENTION

The present invention relates to an electromechanical switching device with at least one movable contact and respective actuator in a housing and means for contactless switching position recognition. Furthermore, the invention relates to an arrangement including a plurality of such devices.

BACKGROUND INFORMATION

In industrial power distribution systems, the operating state is often monitored, in particular the switching position of switching devices, such as on/off or fault triggering, is detected and reported. It is required in a modern system that the switching devices be capable of communicating with monitoring and control devices via a data bus; the operating data must be acquired in a suitable manner for this purpose. In the case of a building system, for example, line protection switches must be provided with a contactless position recognition system, which detects and communicates via a data bus, in particular, the on or off position, overcurrent triggering, short-circuit triggering, and/or other switching states.

In the related art, the switching position is normally detected by mechanically coupled switching devices, such as control switches and/or fault signal switches, mounted, for example, on line protection switches, detecting the on/off position and possible overcurrent or short-circuit fault triggering. Such a mechanical coupling of the switching elements on the mechanism of the switching device to be monitored is accomplished via openings in the switch housing, through which electrically conducting gases, capable of producing electric leakage paths, for example, may exit in the case of a short-circuit such a coupling also increases the actuating force required for switching on the switching device. In addition, in the case of switching, through a contact, small currents and voltages normally used in electronic signal processing, contact problems may appear in the additional switching components due to corrosive effects, which prevents the switching position from being reliably recognized.

The European Patent Application No. 94106336.4 describes a process for detecting switching positions, wherein the current- and voltage-conducting components are coupled to the switching device via a capacitor externally mounted on the switch housing. The signals measured by a capacitive voltage splitter have characteristic shapes for the on and off positions of the switching device and can also be evaluated for overcurrent and the like.

U.S. Pat. No. 4,706,073 describes a switching device wherein optical and magnetic sensors detect the triggering position of the switch handle from the device front or by backlighting from both sides of the switching handle. Part of the sensors is mounted in the switching cabinet door, so that the triggering function can be detected only with the door closed. Switching positions that cannot be recognized by the position of the switching handle alone cannot be detected and therefore no differentiated switching position detection is possible. Furthermore, U.S. Pat. No. 4,611,209 describes a switching device wherein the switching handle contains a permanent magnet which, in a certain position, actuates a Reed contact. In this case again only the ON/OFF and switch triggered positions can be detected. With a non-enclosed arrangement of the permanent magnets, there is a contamination hazard, which in practice can result in erroneous indications.

The object of the present invention is to modify an electromechanical switching device in a simple manner, making contactless switching position detection possible.

SUMMARY OF THE INVENTION

This object is achieved according to the present invention by providing sensors for detecting switching positions arranged in a separate sensor housing in suitable locations so that the sensor housing for monitoring the switching positions is attached to the side of the switching device housing and no mechanical, optical, or electrical conductor linkage exists from the switching device housing and/or the line conductors connected thereto to the inside of the sensor housing.

It has been shown that static differential Hall effect sensors are suitable for detecting the on/off position of the switching device, overcurrent triggering and contact welding. A Reed contact, however, is better suited for detecting short-circuit triggering.

According to another embodiment of the present invention, a sound sensor, whose overcurrent triggering signal is evaluated for short-circuit detection, can be provided in the sensor housing for detecting the switching noise. The sound sensor is preferably a capacitor microphone or a piezoelectric microphone.

Compared to the short-circuit detection via magnetic field detection alone, the advantage of the additional sound detection is that the location and distance of the sound source from the sound sensor have little influence over the sound signal and not shielding effects appear as is possible in the case of magnetic fields generated by ferromagnetic components. To provide the short-circuit event detection that is reliable and insensitive to interference, the sound event signal detected by the sound sensor, in particular an overcurrent triggering signal generated by a differential Hall effect probe, is advantageously further processed via monoflops and an AND element and only when both signals overlap in time or occur within a short time interval is a short-circuit event indicated.

With the additional sound sensor, short-circuits in one or more phases of multipole switches can be reliably detected, since the sound sensor is 3 to 10 cm away from the sound event of the switch pole. It is assumed that the sound event caused by a short-circuit occurs approximately at the same time as triggering of one phase of the conductor protection switch, so that in particular interference noise sources can be suppressed via a time window for the logic operation AND between the two events.

In an advantageous combination of the measures proposed according to the present invention, an arrangement with a plurality of switching devices configured in an inventive manner can be provided, wherein the switching devices are connected to a monitoring device via a data bus and report the occurrence of a triggering condition via this bus without delay. In this arrangement, the switching devices are mounted in a common distribution cabinet as distribution switches, and a short-circuit is detected on the distribution switches by one or more permanently installed sound sensors at suitable test points in the distribution cabinet. In another embodiment according to the present invention, the sound events, selected by sound level and time characteristics, can initially be detected as possible short-circuit events and are reported to the monitoring device without delay as electric signals via the data bus. Then the monitoring device suppresses the sound signal unless a triggering signal occurs within a predefined time window, and determines that short-circuit triggering occurred if the sound signal and the triggering signal occurred within the predefined time window. The time window for the coincidence test of the triggering and sound signals is therefore activated by the first signal. The sound event is reliably detected by suitably located sound sensors, and the monitoring device can attribute the short-circuit triggering to the distribution switch that sent the triggering signal.

DETAILED DESCRIPTION OF THE INVENTION

Figure 1:
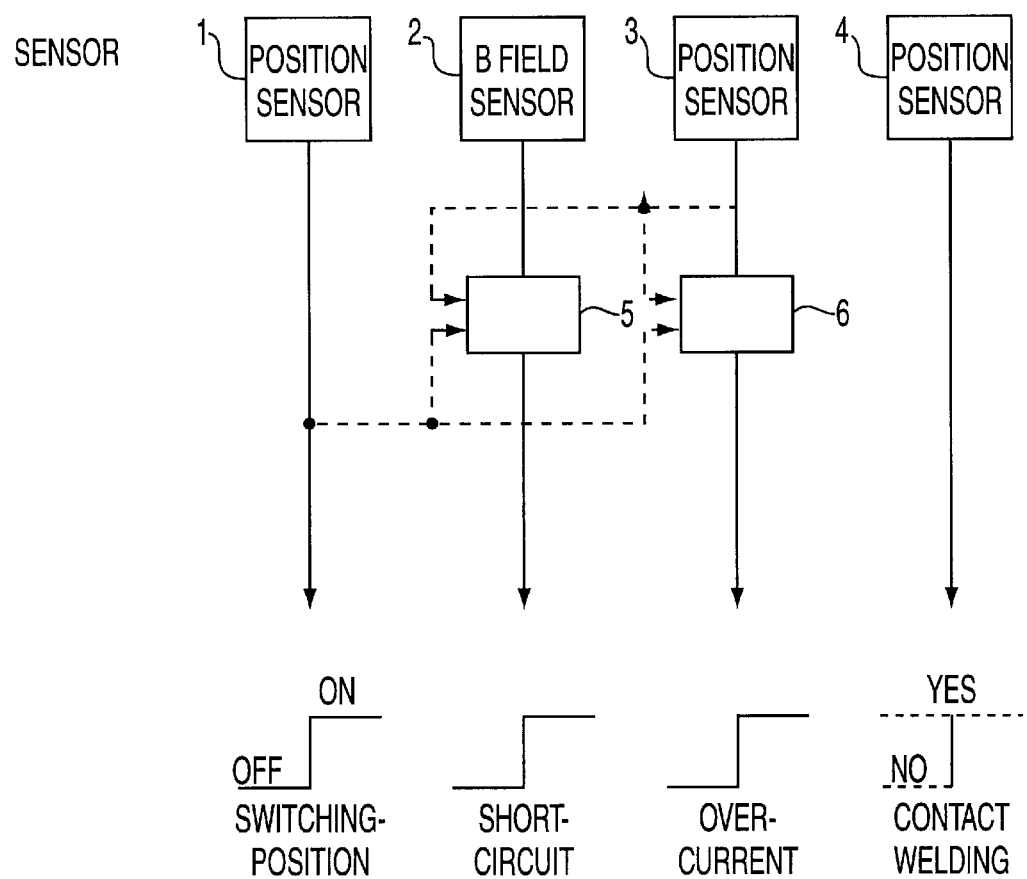
FIG. 1 shows a block diagram of a device according to the present invention for contactless detection of the switching position of a switching device.

The first line of FIG. 1 shows the desired detection function. These are, in particular, the switching position, a possible short-circuit and/or an overcurrent, as well as a possible contact welding. The respective sensors are listed below each function. In particular, a position sensor 1, a B field sensor 2, as well as other position sensors 3 and 4 are provided. Sensors 2 and 3 are coupled to the outputs via electronic memories 5 and 6, with feedback loops for electronic memory reset and reset disable are provided.

Figure 2:
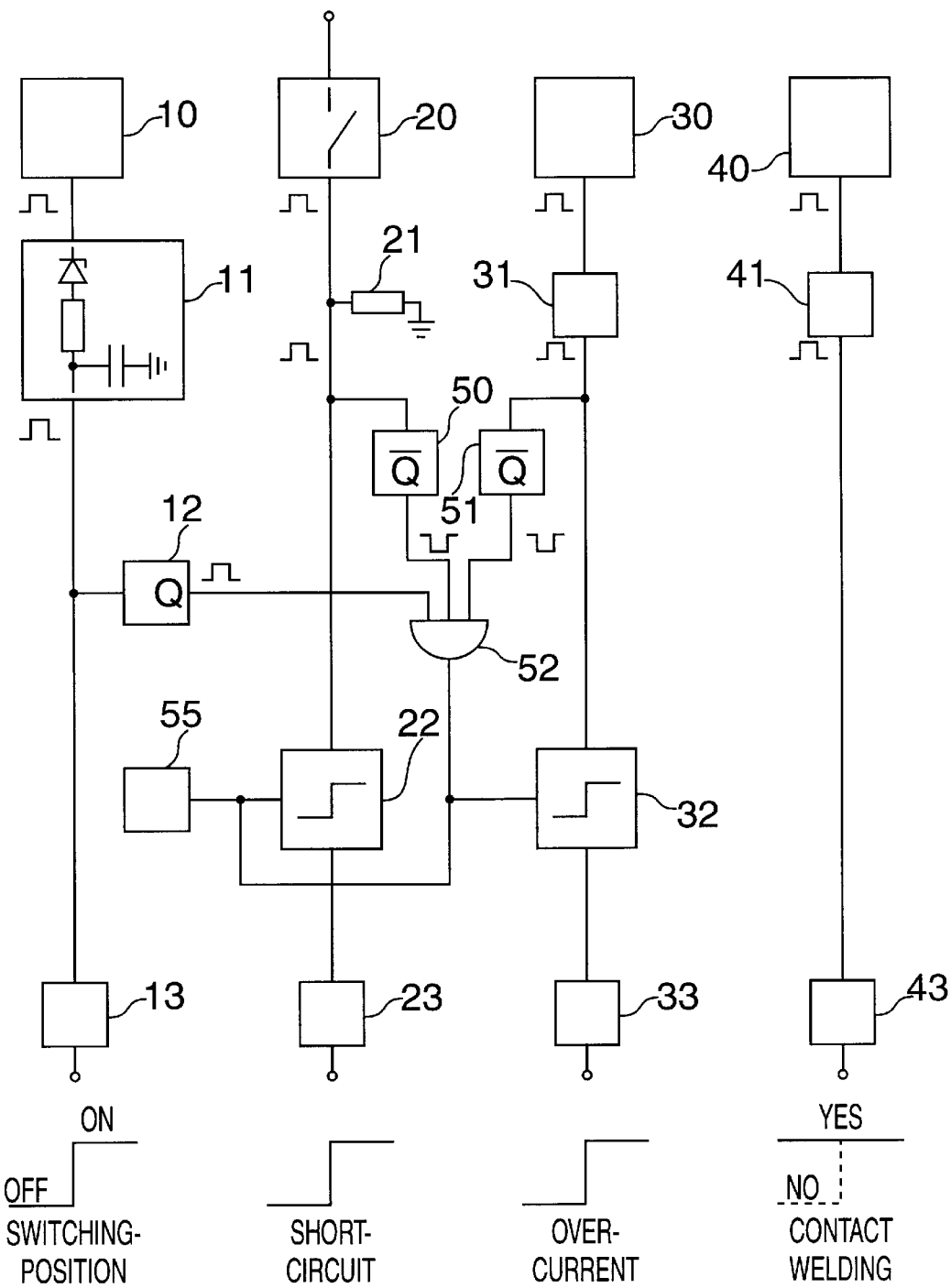
FIG. 2 shows a schematic diagram of a sensor circuit according to the present invention.

FIG. 2 shows static differential Hall effect probes 10, 30, and 40, used as position sensors 1, 3, and 4 of FIG. 1. A Reed contact 20 is used as a B field sensor.

Sensor detection of the switching position (on/off) of the switching device is accomplished using the static differential Hall effect sensor 10, whose output voltage is set to "high" or "low" via the position of the ferromagnetic actuator clip. This output voltage is also uniquely set after switching the electronic supply voltage off and on again, since the ferromagnetic actuator clip does not leave the previously defined physical sensing area of sensor 10. The same is true for contact welding sensor 40, which monitors the position of the contact shaft on one of the small steel cylinders fastened to the shaft. To detect overcurrent triggering, a static differential Hall effect sensor 30 is used, which measures the change in position of a steel rod mounted on the latch end of the latch lever. For example, such a steel rod can be 4 mm long and 4 mm in diameter. When unlatching, the path of the steel rod is greater than the physical measuring area of the sensor, so that the signal edge (e.g., high→low) can be measured at the output of the differential Hall effect sensor as a unique triggering signal. The signal edge sets an electronic memory, which displays overcurrent triggering until the memory is reset.

Short-circuit triggering is conveniently detected according to FIG. 2 by Reed contact 20, which switches independently of a magnetic field's polarity provided this field has a sufficiently high intensity. Measurements with a Reed contact of a sturdy design resulted in switching on at magnetic induction readings of 3 to 4 mT. Magnetic fields of this magnitude are generated, for example, as stray fields of a line protection switch triggering coil with 1200 ampere-turns. The Reed contact 20 tested had a switching-on delay of approximately 0.2 ms for high short-circuit currents. After the decay of the short-circuit current, Reed contact 20 switches off again. The switching signal of Reed contact 20 sets an electronic memory that stores the short-circuit triggering until it is reset.

Alternatively to Reed contact 20, a possible short-circuit can also be monitored with other magnetic field-sensitive probes, such as Hall effect ICs, for example, a Hall effect switch, and further processed using an analysis logic.

The process of setting and resetting the electronic memories of short-circuit making switches must be controlled in a specific way. Thus when a line protection switch is set to the ON position, short-circuit switching may occur, although the knob is brought to the ON position; this is called "free triggering." Immediate resetting of the electronic memories during overcurrent or short-circuit triggering is disabled by linking the switch-on signal with the "no overcurrent triggering" and "no short-circuit triggering" signals through an AND logic operation.

In FIG. 2 monoflops 12, 50, and 51, whose non-inverting outputs Q and inverting outputs Q, connected to the inputs of an AND element 52, whose output activates the reset inputs of flip-flops 22 and 32, are provided for setting the pulse duration for the above-mentioned purpose. Reset and reset disable are set up this way.

In particular, the schematic for switching position detection in FIG. 2 includes sensors 10, 20, 30, and 40 for detecting different states, pulse generators 11, 31, and 41 consisting of a Zener diode for correcting the offset voltage and an RH low-pass filter connected in series, a load resistor 21 for Reed contact 20, as well as a memory circuit for the transient signals of short-circuit sensor 20 and overcurrent sensor 30, with the memory circuit comprising two flip-flops 22 and 32, whose stored signal states are reset as a function of time by the reset circuit consisting of monoflops 12, 50, and 51, AND element 52 and interference suppressor 55. Actuators 13, 23, 33, and 43 are used for adjusting the level of the switching position signals for further processing, such as visual display, bus injection and the like.

Figure 3:
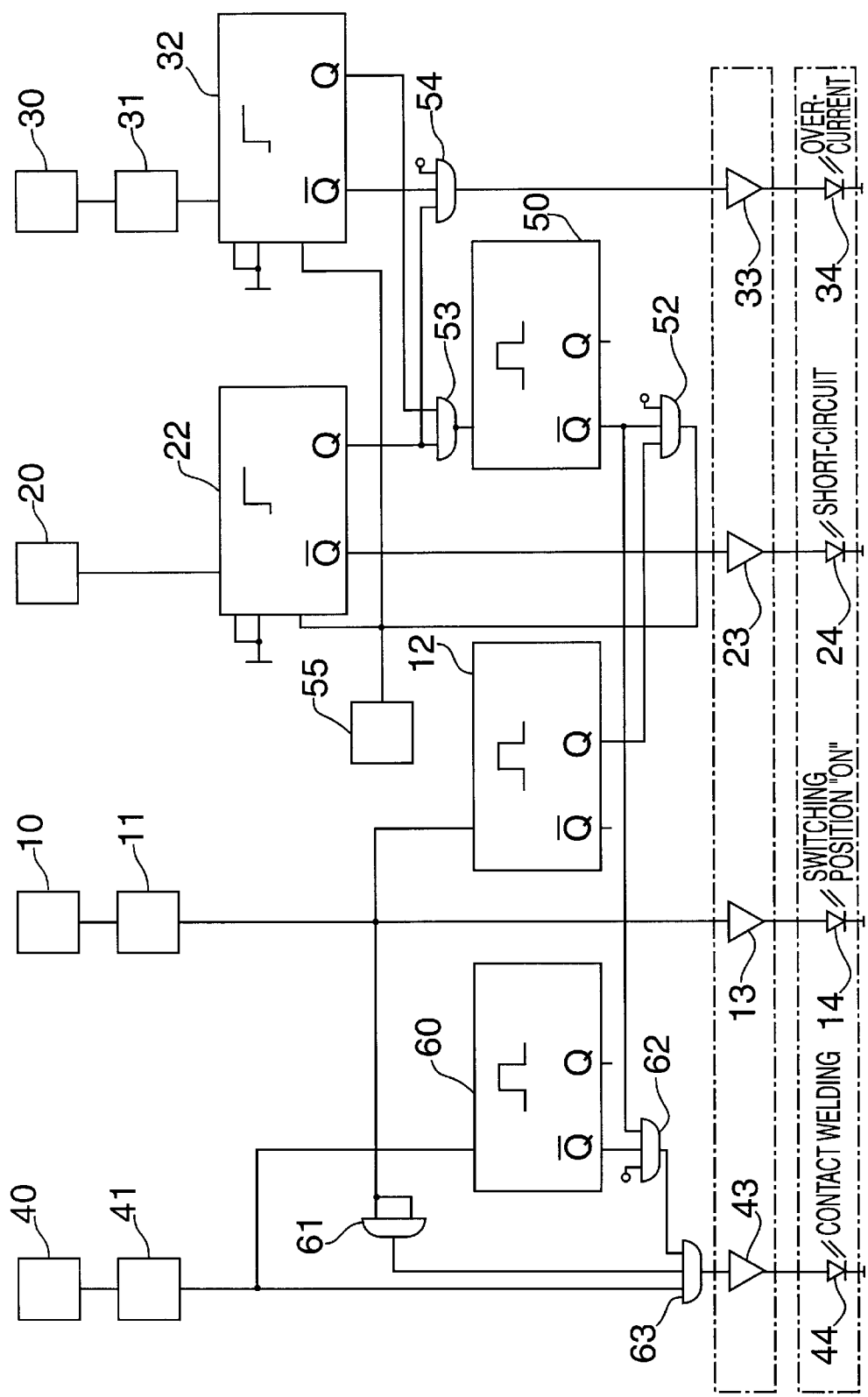
FIG. 3 shows a schematic diagram of a bus-independent sensor circuit as an alternative to the circuit shown in FIG. 2.

The schematic of FIG. 3 shows an embodiment of a bus-independent sensor circuit for detecting the switching state according to the present invention. Contrary to the circuit of FIG. 2, the switching states are analyzed and displayed in the circuit of FIG. 3 itself. The schematic of FIG. 3 therefore contains additional logic operations for analyzing and displaying the switching states, such as on/off position, short-circuit, overcurrent, and contact welding. Thus the output signals of flip-flops 22 and 32 are connected via AND element 54 so that the overcurrent display is disabled in the case of a short-circuit and only the short-circuit display is activated. The reset circuit is formed by the two monoflops 12 and 50, AND element 52, NAND element 53, as well as interference suppressor 55. Contact welding is detected as such if the contact shaft remains in the ON position during the OFF state of the switching device. For this purpose, the two sensor signals "switching position" and "contact shaft" are linked with time control via monoflops 12 and 60, NAND element 61, and AND elements 62 and 63. Finally, the switching status is visually displayed by display devices, for example, LEDs 12, 24, 34, and 44.

Figure 4:
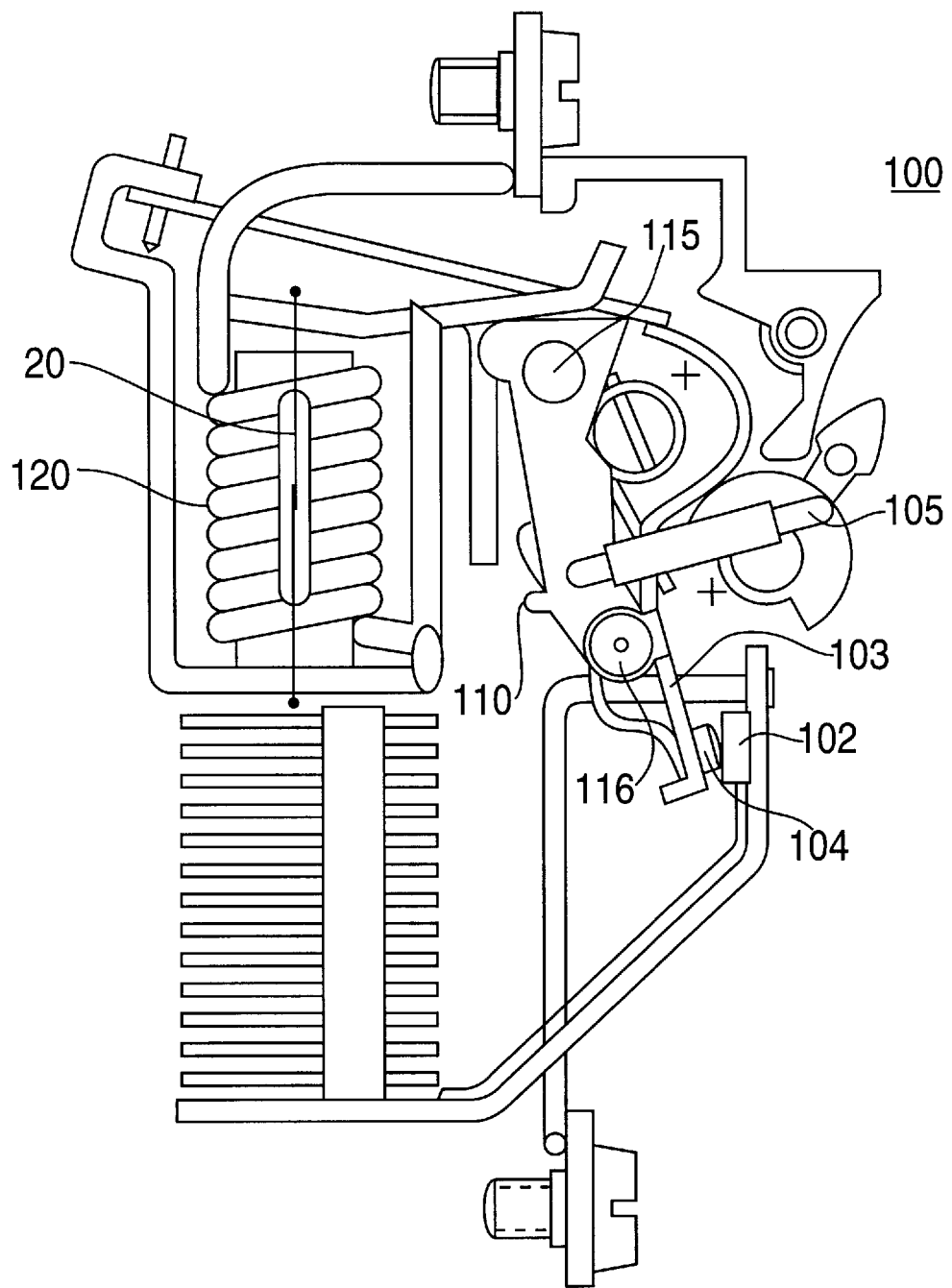
FIG. 4 shows an electromagnetic line protection switch for the arrangement of special sensors on the housing wall and the required adjustment measures for actuating the sensors according to the present invention.

In FIG. 4, 100 denotes a conventional switching device, for example, a line protection switch with the improvements according to the present invention. Such switching device 100 contains, basically, fixed contact 102 and a movable contact 104 arranged on movable contact support 103. The movable contact support 103 is mechanically attached to the latching mechanism via a ferromagnetic actuator clip 105.

The mechanics and the actuators of such conventional switching device shall not be described in detail here. The mechanical driving elements are collectively denoted by 110 and the magnetic actuator by 120.

In the present invention, it is advantageous for the actuator clip 105 to be made of a ferromagnetic material. The thickness of the actuator clip 105 can sometimes be increased to 2.5 mm, for example, to increase its influence on the shape of the magnetic field. Furthermore, small ferromagnetic rods 115 and 116 are mounted on the latch lever to monitor its position. The position of elements 105, 115, 116 made of ferromagnetic material is detected by Hall effect probes 10, 30, and 40. Furthermore, Reed contact 20, in addition to magnetic actuator 120, is provided for detecting current-induced magnetic fields.

Sensors 10, 20, 30, and 40 are mounted on the outside of the switching device housing in the embodiment shown in FIG. 4. The projection of the probe positions on the plane of the drawing is denoted by a + sign or a stylized Reed contact symbol. Some or all of the probes can also be mounted inside the housing or on the housing wall.

Figure 5:
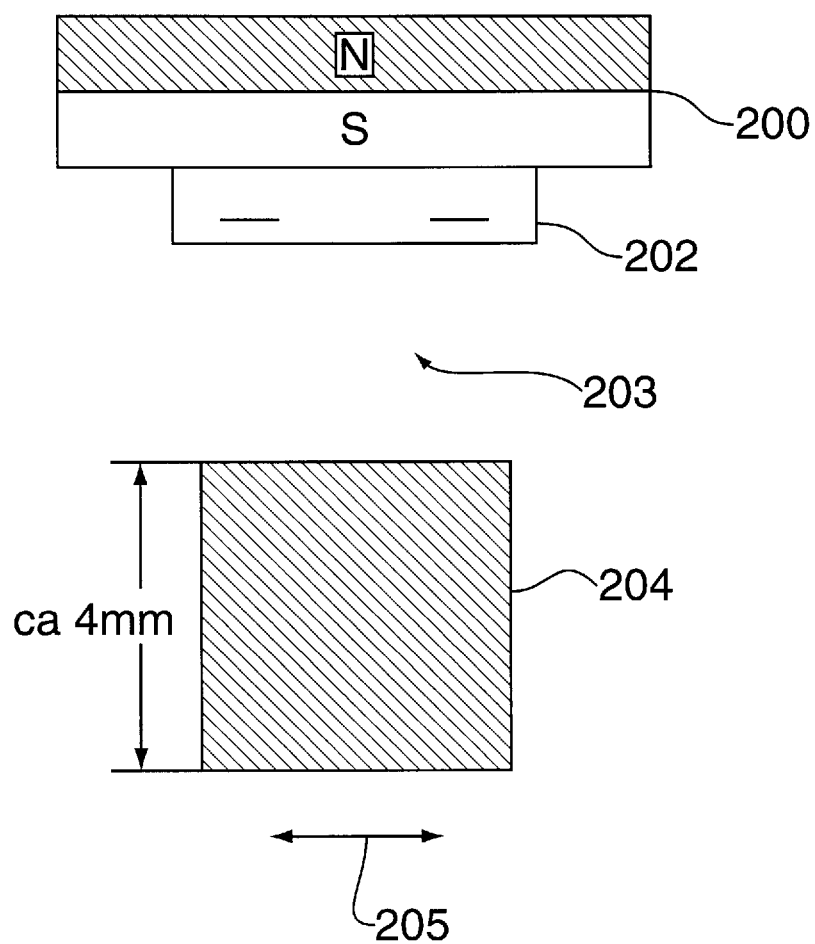
FIG. 5 shows a schematic of the sensor for position monitoring of the ferromagnetic elements shown in FIG. 4.

FIG. 5 shows the schematic of a measuring arrangement for contactless position detection on one of the small ferromagnetic rods 115 and 116 shown in FIG. 4. For this purpose, the differential Hall effect probe 202 is at a given distance, denoted as air gap distance 203, from a ferromagnetic element 204. On the side facing away from the air gap of probe 202 there is a permanent magnet 200, whose magnetic field traverses the probe in an approximately vertical direction and enters the air gap. When the ferromagnetic element moves in the direction 205, the magnetic field lines entering the element are shifted accordingly. The resulting field distortion at the points of the two Hall domains results in a difference output signal of differential Hall effect probe 202.

As an alternative to detecting the position of ferromagnetic elements, the differential Hall effect probe can also directly determine the position of a small hard magnet element. In this case, permanent magnet 200 on the back side of probe 202 shown in FIG. 5 can be omitted.

With the sensor arrangement illustrated in FIGS. 4 and 5, the four switching states—on/off, overcurrent triggering, short-circuit triggering and contact welding—can be monitored by the sensors reliably and with low sensitivity to interference. This is further reinforced by the following:

The ON and OFF signals and the welded contact signal are displayed permanently.

The overcurrent triggering signal is detected and stored at moderate current intensities, e.g., $I \leq 5^*I_N$.

The short-circuit triggering signal of Reed contact 20 stays on until the current decays to a low current intensity, so that reliable detection and storage is ensured. For example, Reed contact 20 closes in the stray field of the magnetic coil when the current flowing in a switching device with triggering characteristics B16 exceeds 130 A and opens when it drops below 40 A.

To prevent Reed contact 20 from being influenced by external magnetic fields, e.g., from neighboring switching devices, the Reed contact can be provided with magnetic shielding on the side facing away from the switching device being monitored.

A device for contactless switching position detection was described in detail above using the example of line protection switches. The ON/OFF, overcurrent triggering, and contact welded states are detected using differential Hall effect probes on ferromagnetic transmitter elements, while short-circuits are detected via the magnetic stray field of the magnetic triggering element using a Reed contact. Such a device can be designed as a compact detection module installed in a separate, e.g. single-module, housing and mounted on the side of the line protection switch to be monitored.

Since magnetic fields decrease in intensity with increasing distance from the point where they are generated in the proportion 1/r, the switching position on single and multi-pole line protection switches cannot be detected with the same detection module in a simple manner. Due to the mechanical coupling of the switching poles of a multipole line protection switch via the switch operating handle and the triggering shaft, this is not true for the ON/OFF and overcurrent triggering positions, but only for the two other positions—short-circuit triggering and contact welding. In particular, to recognize short-circuits in multipole switches, however, the switching device affected must be reliably determined regardless of the phase that carries the short-circuit current.

In conventional line protection switches the minimum current required for short-circuit triggering depends on the specific triggering characteristics of the switch and its nominal current. For example, for a 16 A line protection switch with standard triggering characteristics B, the minimum current is 5 times the nominal current, i.e., $I \approx 100$ A.

For such a current, the switching noise generated by the switch-off arc is clearly audible and can therefore be detected with a microphone. With increasing short-circuit current intensities, this switching noise becomes so loud that reliable detection of such a short-circuit event is ensured. For this purpose, a microphone is built into the switching position detection housing, with the distance of the switch pole from the sound event being 3 to 10 cm, depending on the distance of the pole for a laterally attached, multipole line protection switch, which is illustrated in FIG. 6a and 6b.

Figure 6A:
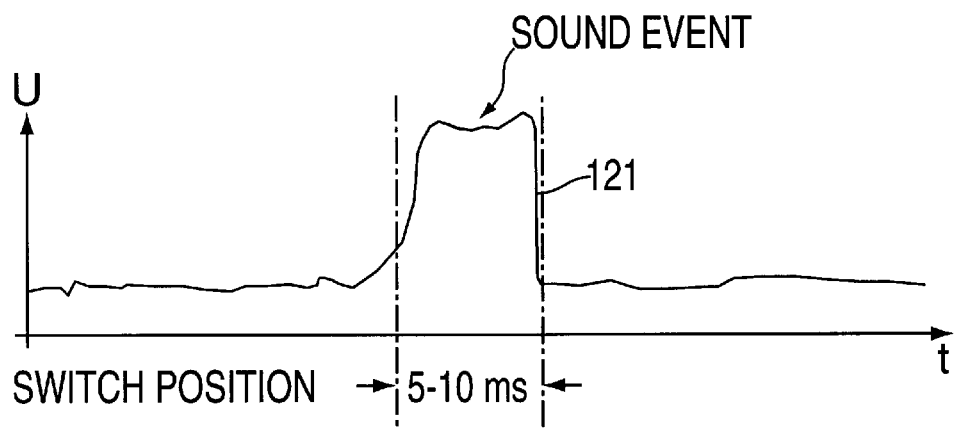
FIG. 6a shows a first schematic illustration of the sound signal curve during switching off, plotted against time.

FIG. 6a shows the microphone voltage U plotted against time t. Switching off produces a distinct sound event, which is shown in graph 121. For example, such a sound event may have a time span of 5 to 10 ms.

Figure 6B:
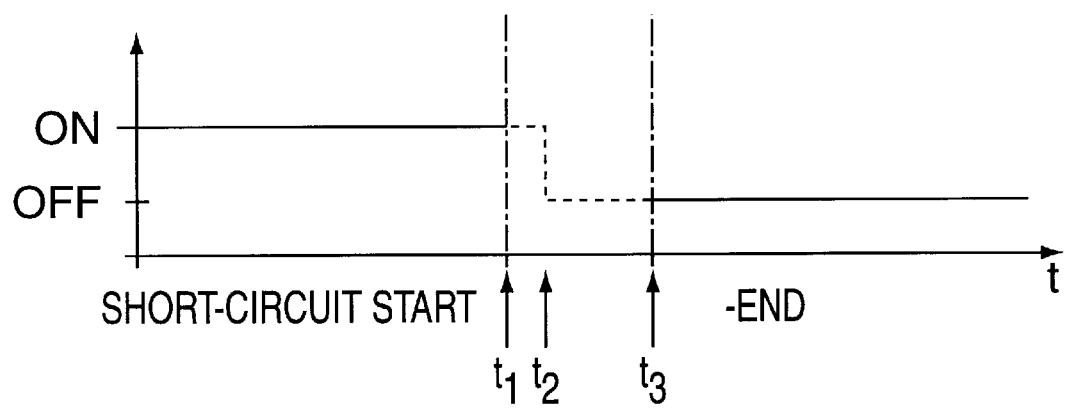
FIG. 6b shows a second schematic illustration of the sound signal curve during switching off, plotted against time.

FIG. 6b shows that when a noise event occurs at time $t_1$, a short-circuit starts, which ends at time $t_3$. In this example the latch is brought to the off position by the undelayed trigger at time $t_2$.

Figure 7:
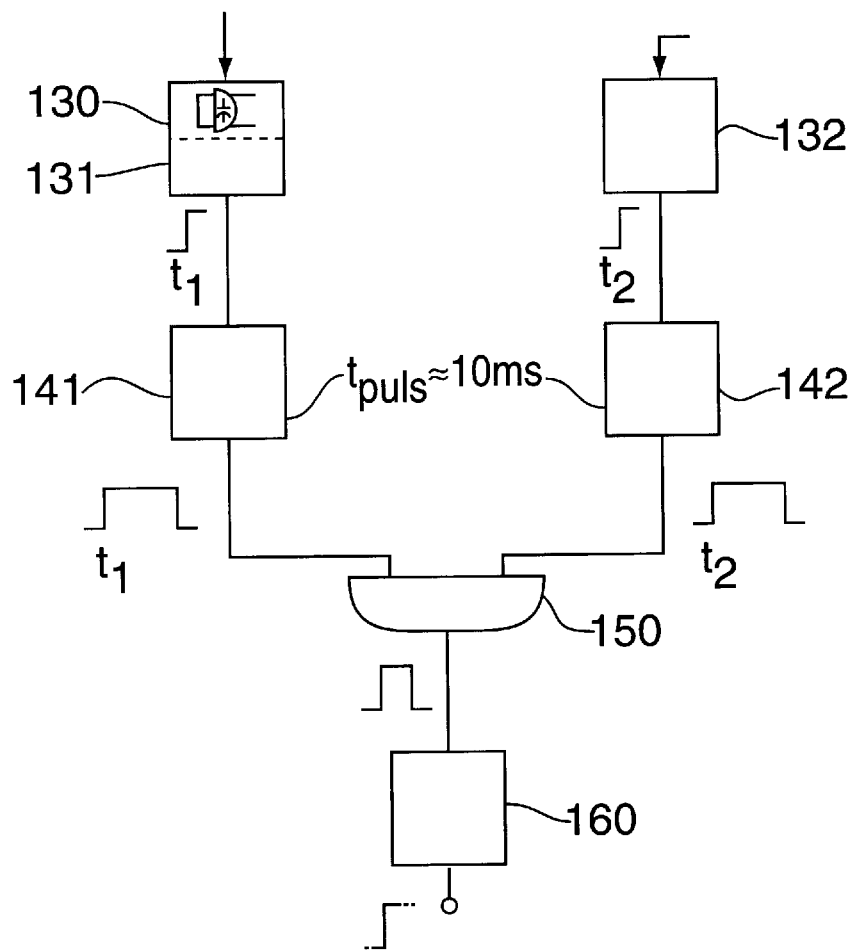
FIG. 7 shows the principle of a circuit for acoustic short-circuit detection according to the present invention.

FIG. 7 shows a microphone 130 with a corresponding threshold value switch 131, and a differential Hall effect probe 132. Monoflops 141 and 142 are downstream from both with monoflop 141 being activated by the respective sensor signal at time $t_1$ and monoflop 142 at time $t_2$. Thus time pulses $t_1$ and $t_2$, shifted in relation to one another, can be generated in the output lines, which is illustrated in FIG. 3. Both output signals are then sent to an AND element 150 with downstream flip-flop 160. This circuit causes a short-circuit event to be displayed when the two sensor signals overlap in time.

In the arrangement schematically illustrated in FIG. 7, it is determined that a short-circuit switching of the line protection switch monitored has occurred based on the coincidence in time of the sound event and the triggering.

Figure 8:
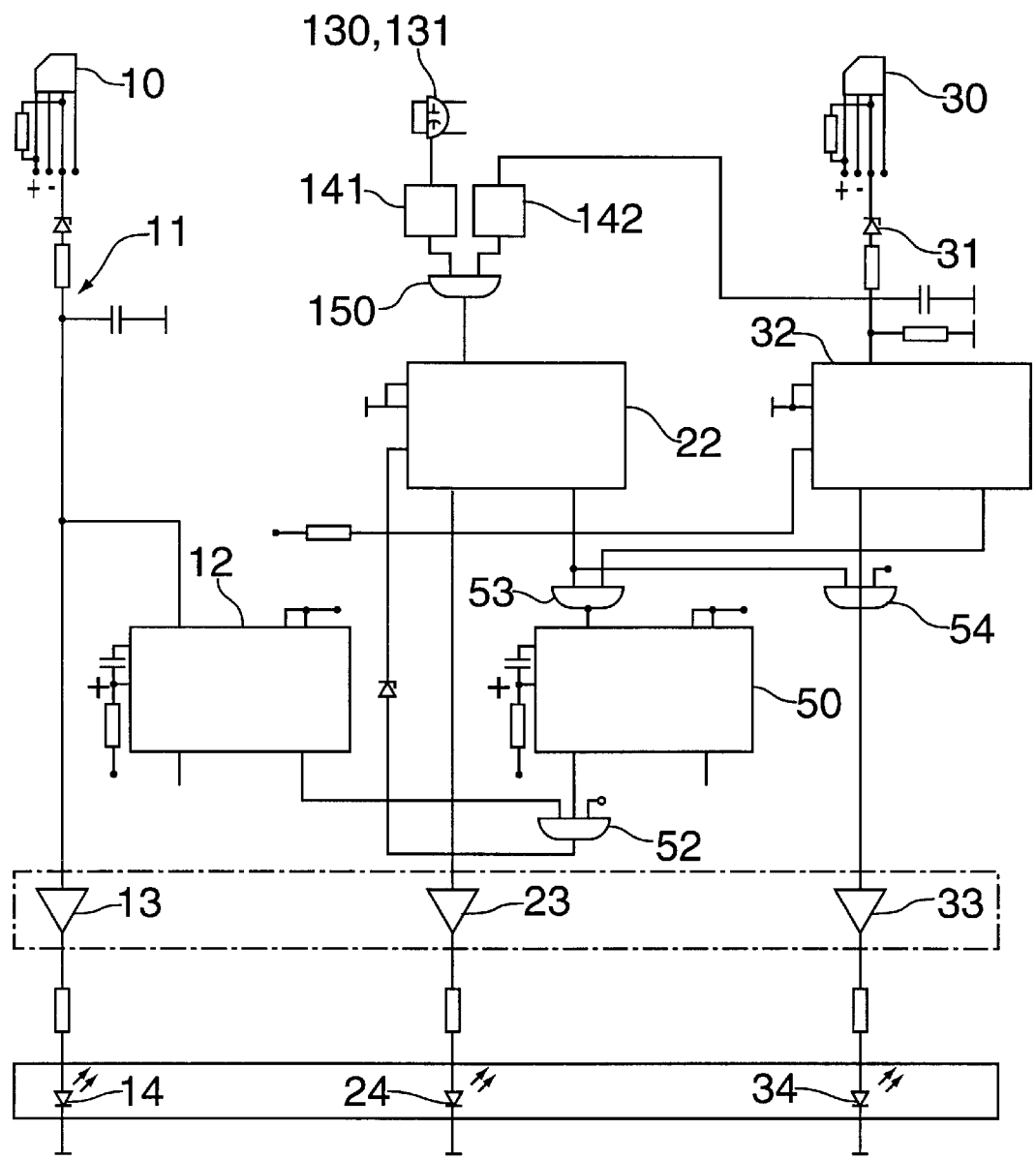
FIG. 8 shows an electronic circuit as shown in FIG. 1, supplemented with acoustic short-circuit triggering detection.

In FIG. 8, the circuit of FIG. 1 is modified in the sense that, instead of short-circuit sensor 20, an arrangement shown in FIG. 3 with acoustic sensor 130, 131 and two monoflops 141 and 142, whose output signals activate flip-flop 22 via AND element 150 shown in FIG. 1, is provided.

The switching position detection device described using FIG. 8 is equally well suited for monitoring single-pole and/or multipole line protection switches.

Figure 9:
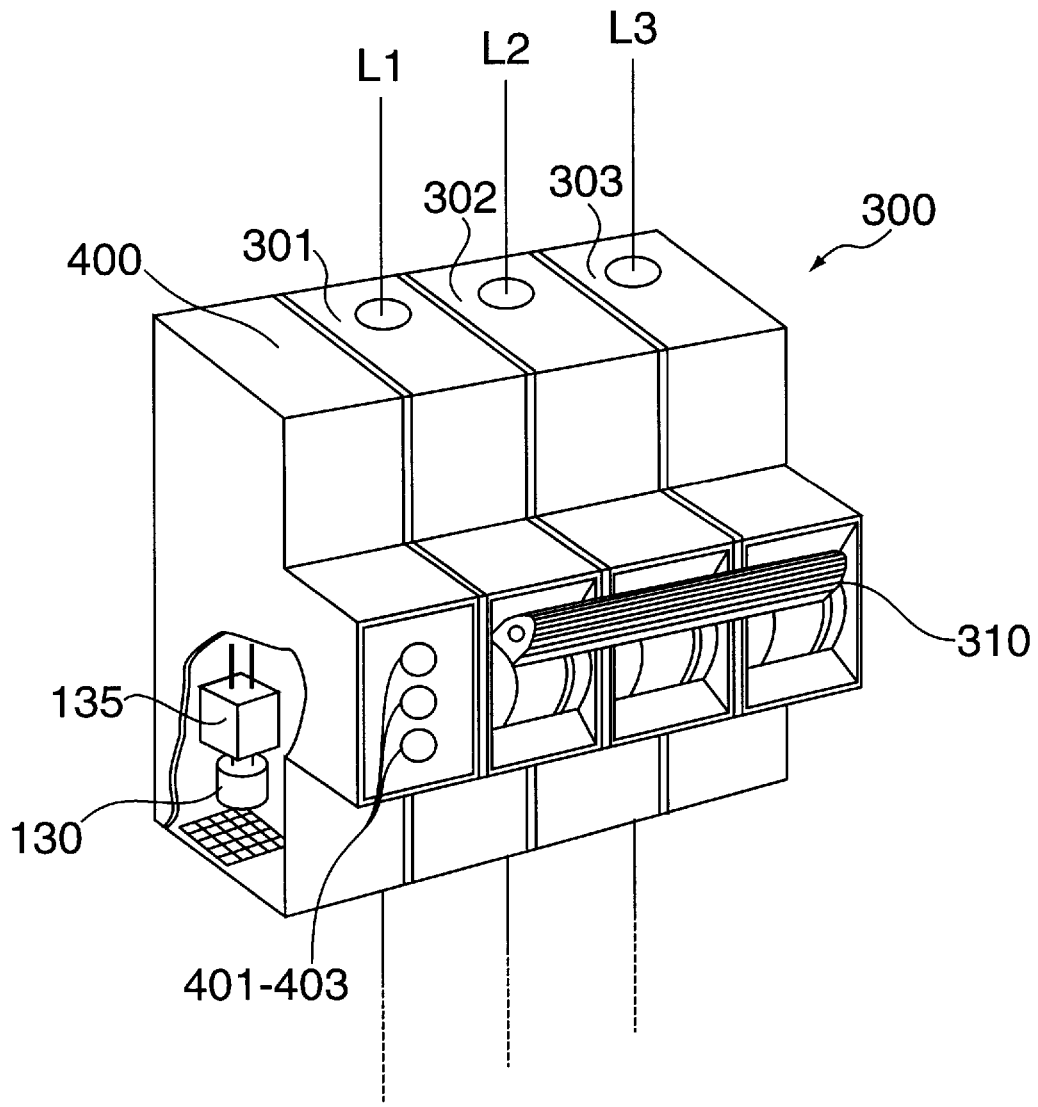
FIG. 9 shows the construction of a three-pole line protection switch with a laterally mounted monitoring device for contactless switching position detection according to the present invention.

FIG. 9 shows the physical arrangement of a three-pole line protection switch and a device for contactless switching position detection. As shown, the common housing 300, including parallel subhousings 301, 302, 303 for the individual phases L1, L2, L3, with a common handle bar 310. The detection module operating shown in FIGS. 2 and 3 is flange-mounted separately as a separate housing 400 and has three diodes 401 through 403 as optical switching position displays in the extension of handle bar 110.

The switching positions of the three switch poles—ON/OFF or overcurrent triggering—are mechanically coupled via the common handle bar 310 and the triggering shaft, and are monitored via magnetic fields sensors, while short-circuit triggering in one or more phases is detected by sound sensor 130 with downstream NF amplifier 135, despite the different distances between the sound events and the sensor.

With the device shown in FIGS. 6 through 9, reliable short-circuit discrimination regarding the corresponding line protection switch becomes possible for multipole line protection switches.

In a distribution with a plurality of line protection switches, installed as distribution switches in a distribution cabinet, it can be advantageous to detect short-circuits using one or more sound sensors and thus reduce the associated cost. This assumes that each of the switching devices to be monitored issues an undelayed signal to a central monitoring unit when triggered. This is in particular the case when the switching devices communicate with a monitoring device through a data bus.

Figure 10:
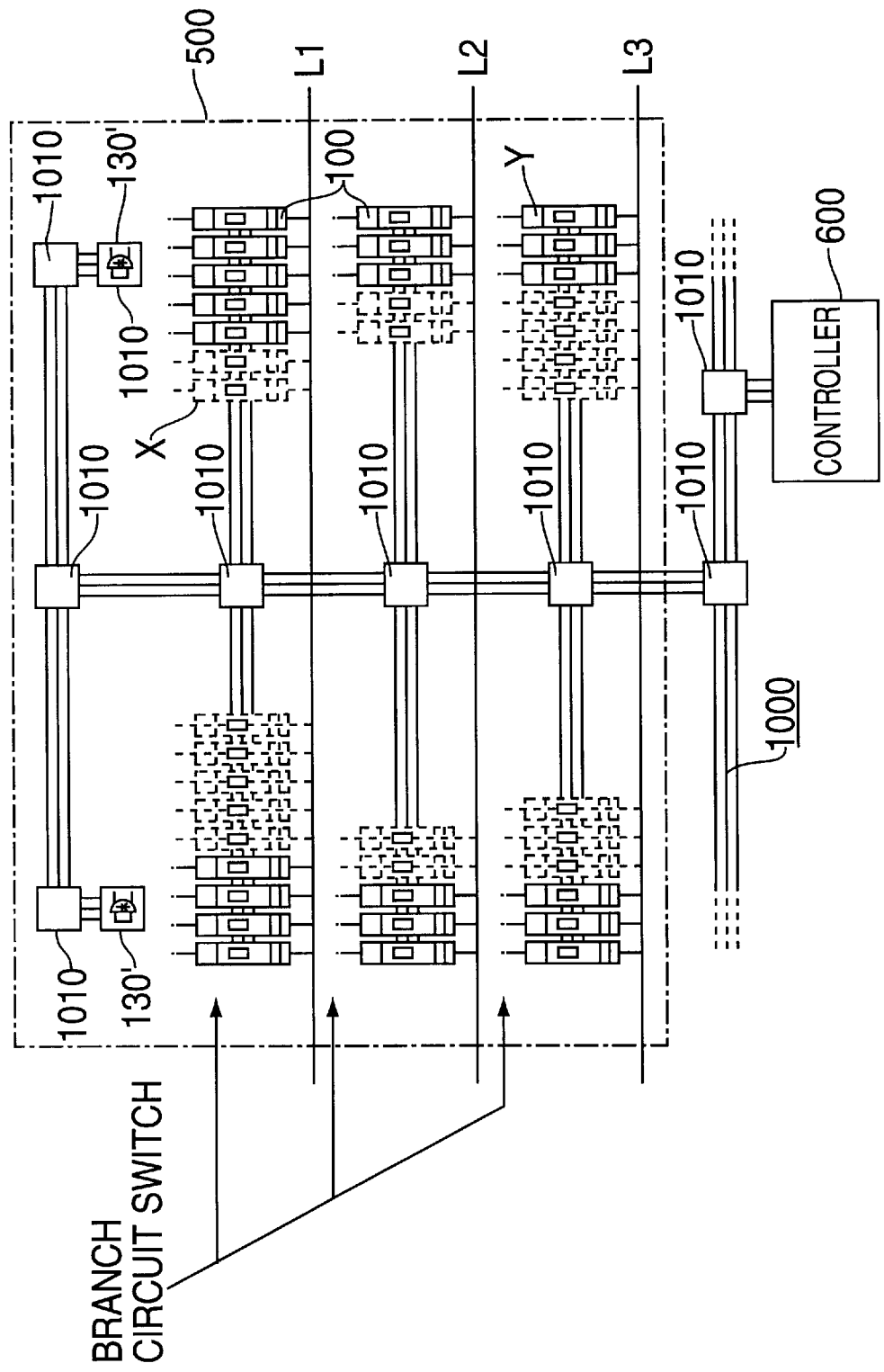
FIG. 10 shows a distribution cabinet with a plurality of distribution switching devices to be monitored.

FIG. 10 schematically shows the design of a distribution cabinet 500, wherein the individual installed switching devices 100, 100', . . . report their switching positions, such as ON/OFF, and/or triggering via a data bus 1000 with the corresponding bus coupling devices 1010, to a controller 600 used as a monitoring device, which also receives signals from, for example, two sound sensors 130 and 130', as soon as characteristic acoustic signals occur in distribution cabinet 500.

The acoustic signals are selected regarding sound level and time characteristics of the sound signal by the electronic signal processing system to separate switching noise from underground and interference noises. Thus, it is achieved that, with sufficient probability, sound sensor 130 or 130' only responds to switching noises originating from short-circuit triggering and having a duration of 5 to 10 ms.

Both the switching position signals and sound signals are transmitted without delay via data bus 1000 to controller 600, and controller 600 determines, using a time window, whether both signals originate from the same event, namely short-circuit triggering or were produced independently. The time window is activated by the signal first received by controller 600 and is closed again after a predefined time period T. If controller 600 also receives the second signal within the time window, it determines, from the coincidence of the triggering and noise signals, that short-circuit triggering has occurred.

With the address of the sending switch, e.g., switch X in FIG. 10, the short-circuit event is assigned to this device; thus the short-circuit triggering status of each individual distribution switch is detected within distribution cabinet 500.

Figure 11:
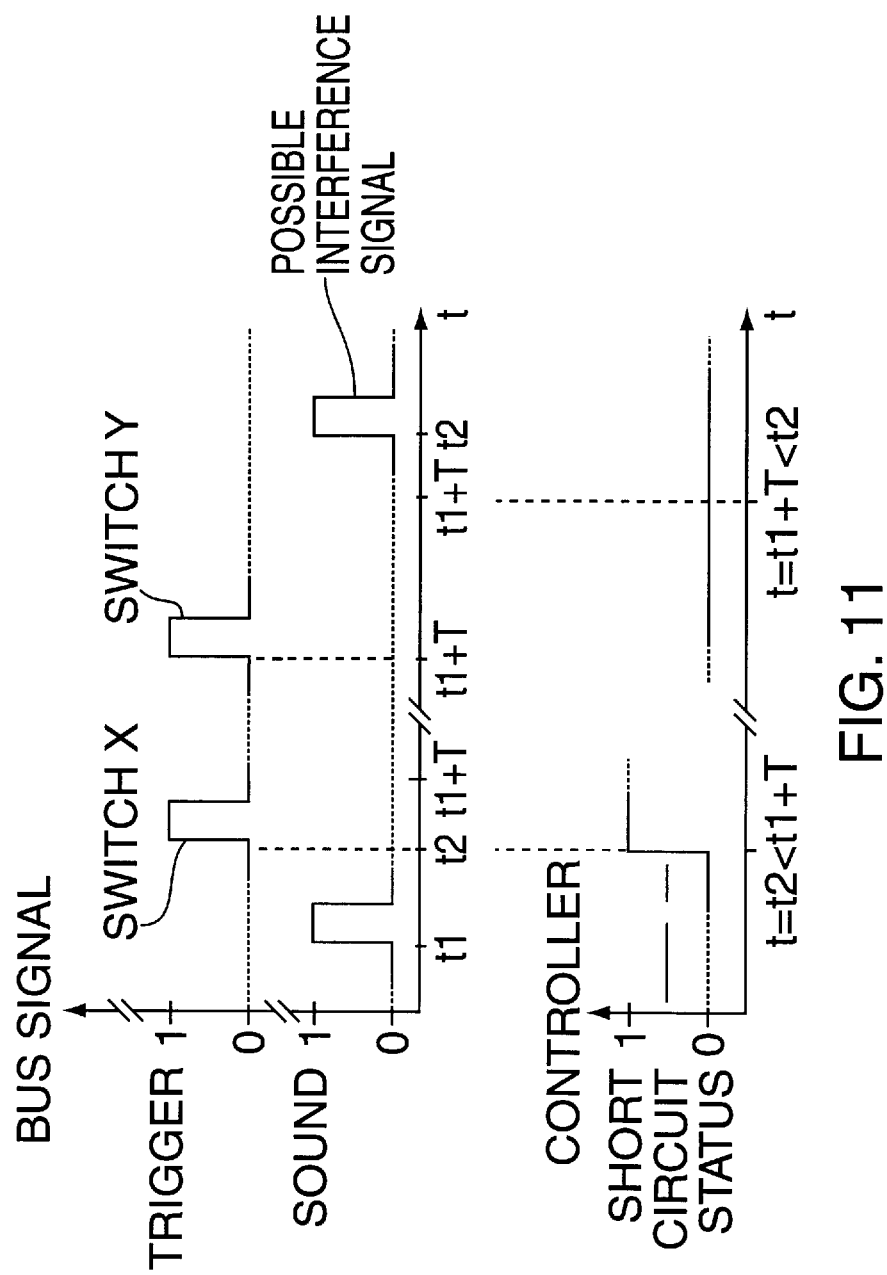
FIG. 11 shows a signal sequence for an arrangement shown in FIG. 10.

FIG. 11 shows a sequence of a triggering and a sound event signal received by controller 600 via the data bus. If the second signal falls within the time window triggered by the first signal, controller 600 recognizes it as short-circuit triggering and links it with the address of the issuing switch, for example, switch X. If the second signal falls outside the time window triggered by the first signal, triggered by switch Y, the triggering signal is interpreted by controller 600 not as short-circuit triggering, but as overcurrent triggering of the issuing switch Y. The sound signal is then evaluated by controller 600 as an interference signal and suppressed.

We claim:

1. An electromagnetic switching device comprising:
   at least one movable contact disposed in a first housing and having a switching state;
   an actuator disposed in the first housing, the actuator being associated with the at least one movable contact; and
   at least one sensing apparatus disposed in a housing interior of a second housing, the at least one sensing apparatus contactless detecting the switching state and generating sensor signals corresponding to the switching state,
   wherein the second housing is mounted on a side of the first housing, the at least one sensor apparatus detecting the switching state without an electrical conductor connection, without an optical linkage and without a mechanical linkage between the housing interior of the second housing and the first housing.

2. The switching device according to claim 1, wherein the at least one sensing apparatus includes magnetic field sensors.

3. The switching device according to claim 2, wherein the at least one sensing apparatus further includes additional sensors.

4. The switching device according to claim 3, wherein the additional sensors include sound sensors.

5. The switching device according to claim 1, wherein the at least one sensing apparatus detects at least one of an ON/OFF position, an overcurrent triggering condition and a contact welding condition of the switching device for measuring position-dependent magnetic fields being generated by permanent magnets.

6. The switching device according to claim 1, further comprising:
   a short-circuit detection sensor disposed in the second housing for measuring a magnetic field of a current flowing in the switching device.

7. The switching device according to claim 1, further comprising:
   a sound sensor disposed in the second housing, the second sensor generating a sound event signal, the sound event signal being evaluated with an overcurrent triggering signal for detecting short-circuits.

8. The switching device according to claim 5, wherein the at least one sensing apparatus includes a static differential Hall effect sensor for detecting the ON/OFF position.

9. The switching device according to claim 5, wherein the at least one sensing apparatus includes a static differential Hall effect sensor for detecting the overcurrent triggering condition.

10. The switching device according to claim 7, wherein the at least one sensing apparatus includes an electronic storage area.

11. The switching device according to claim 8, wherein the first housing includes a contact support pivotably positioned around a rotating shaft, and wherein the Hall effect sensor functions as a magnetic field sensor detecting a position of the rotating shaft.

12. The switching device according to claim 10, wherein a first sensor of the at least one sensing apparatus provides a switching position signal, and a second sensor of the at least one sensing apparatus provides a contact shaft signal, a contact welding being detected via a logic AND operation between the switching position signal and the contact shaft signal.

13. The switching device according to claim 1, wherein the at least one sensing apparatus monitors components of a switching mechanism to determine a position dependence of magnetic fields of permanent magnets, the position dependence being measured by the at least one sensing apparatus.

14. The switching device according to claim 12, further comprising:
   an actuating mechanism cooperating with the at least one movable contact, the actuating mechanism including an actuator clip composed of a ferromagnetic material.

15. The switching device according to claim 12, further comprising:
   an actuating mechanism cooperating with the at least one movable contact, the actuating mechanism including a contact shaft and a latch lever, at least one of the contact shaft and the latch lever including a portion of a ferromagnetic material.

16. The switching device according to claim 14, wherein the portion of ferromagnetic material includes one of a steel rod and a hollow cylinder, the portion having a length of approximately 4 mm and a thickness of approximately 4 mm.

17. The switching device according to claim 6, wherein the short-circuit triggering circuit includes a Reed contact member for detecting a short-circuit triggering.

18. The switching device according to claim 17, wherein the Reed contact member includes an electronic storage area.

19. The switching device according to claim 18, wherein the Reed contact member is shielded from external magnetic fields via a ferromagnetic shield.

20. The switching device according to claim 7, wherein the at least one sensing apparatus includes a differential Hall effect sensor generating the overcurrent triggering signal, wherein the sound event signal and the overcurrent triggering signal are transmitted via monoflops to a logical-AND element to identify a short-circuit event, the short-circuit event being displayed when the sound event signal and the overcurrent triggering signal overlap in time.

21. The switching device according to claim 20, wherein the sound sensor includes one of a capacitor microphone and a piezoelectric microphone situated outside the first housing.

22. The switching device according to claim 1, wherein the at least one movable contact, the actuator and the at least one sensing apparatus have a multipole configuration.

23. An apparatus, comprising:
   a plurality of switching distribution devices each generating a triggering state signal, each of the plurality of switching devices having an ON/OFF position and a triggering position, the triggering position including a short-circuit triggering, the plurality of switching devices being situated in a common distribution cabinet;
   a plurality of sensors detecting the ON/OFF position and the triggering position;
   a monitoring device connected to the plurality of switching devices via a data bus;
   a controller receiving the triggering state signal from the plurality of switching devices without a delay;
   at least one sound sensor detecting a short-circuit at at least one of the plurality of switching distribution devices and being permanently installed at predetermined test points in the common distribution cabinet, the short-circuit being detected as a function of sound events, the sound events being selected according to a sound level and time characteristics and being transmitted as an electric sound signal; and
   a monitoring device receiving the sound signal via a data bus and suppressing the sound signal when the triggering state signal occurs outside a predefined time zone, the monitoring device determining an occurrence of the short-circuit triggering when the sound signal and the triggering state signal occur within the predefined time zone, the monitoring device assigning the short-circuit triggering to a distribution switch of the plurality of switching distribution devices transmitting the triggering state signal.

24. The device according to claim 23, wherein the triggering position further includes an overcurrent triggering.

* * * * *